United States Patent
Bojiuc

(10) Patent No.: US 10,547,218 B2
(45) Date of Patent: Jan. 28, 2020

(54) VARIABLE MAGNETIC MONOPOLE FIELD ELECTRO-MAGNET AND INDUCTOR

(71) Applicant: Dumitru Bojiuc, San Pedro, CA (US)

(72) Inventor: Dumitru Bojiuc, San Pedro, CA (US)

(73) Assignee: Quantakinetic Technologies, LLC, Las Vegas, NV (US)

( * ) Notice: Subject to any disclaimer, the term of this patent is extended or adjusted under 35 U.S.C. 154(b) by 92 days.

(21) Appl. No.: 15/655,385

(22) Filed: Jul. 20, 2017

(65) Prior Publication Data

US 2018/0145546 A1  May 24, 2018

Related U.S. Application Data

(60) Provisional application No. 62/364,319, filed on Jul. 20, 2016.

(51) Int. Cl.
| | |
|---|---|
| H01F 3/00 | (2006.01) |
| H02K 1/06 | (2006.01) |
| H01F 7/08 | (2006.01) |
| H01F 27/34 | (2006.01) |
| H01F 27/38 | (2006.01) |
| H02K 3/04 | (2006.01) |
| H01F 7/20 | (2006.01) |
| H02K 3/28 | (2006.01) |

(52) U.S. Cl.
CPC ............ *H02K 1/06* (2013.01); *H01F 7/08* (2013.01); *H01F 7/202* (2013.01); *H01F 27/346* (2013.01); *H01F 27/38* (2013.01); *H02K 3/04* (2013.01); *H02K 3/28* (2013.01)

(58) Field of Classification Search
CPC ........ H01H 50/18; H01H 50/02; H01H 50/36; H01H 3/28; H01H 51/22
USPC .......................................................... 335/185
See application file for complete search history.

(56) References Cited

U.S. PATENT DOCUMENTS

| | | | | |
|---|---|---|---|---|
| 2,038,787 A | * | 4/1936 | Guerra ................. | G01C 17/30 324/247 |
| 3,161,807 A | * | 12/1964 | Brogan ................. | H01F 7/202 310/11 |
| 3,645,377 A | * | 2/1972 | Zheigur ................ | B07C 5/02 198/381 |
| 3,848,207 A | * | 11/1974 | Bussey ................. | H01F 7/20 335/210 |
| 3,924,211 A | * | 12/1975 | Ioffe .................... | B65G 47/24 198/381 |
| 3,930,212 A | * | 12/1975 | Ioffe .................... | B65G 47/24 198/381 |
| 4,047,068 A | * | 9/1977 | Ress .................... | G21B 1/00 313/161 |
| 4,097,754 A | * | 6/1978 | Farr .................... | H02K 3/28 310/168 |
| 4,484,161 A | * | 11/1984 | Barger ................. | H01F 7/20 333/219.1 |
| 4,847,526 A | * | 7/1989 | Takehara ............. | H02K 1/146 310/185 |

(Continued)

*Primary Examiner* — Shawki S Ismail
*Assistant Examiner* — Lisa N Homza
(74) *Attorney, Agent, or Firm* — Lewis Brisbois LLP

(57) ABSTRACT

A novel variable magnetic monopole field electro-magnet and inductor with equal and stable high density magnetic field winding system for use in any AC-DC electric motor and generator or in any AC transformer including interleaved ferromagnetic supportive cores positioned between the layers of windings.

15 Claims, 11 Drawing Sheets

(56) References Cited

U.S. PATENT DOCUMENTS

| | | | | |
|---|---|---|---|---|
| 5,030,936 A * | 7/1991 | Zammit | H01F 7/06 | 335/279 |
| 5,117,212 A * | 5/1992 | Yamamoto | H01F 6/00 | 335/210 |
| 5,164,622 A * | 11/1992 | Kordik | H02K 3/28 | 310/156.26 |
| 5,319,844 A * | 6/1994 | Huang | H02K 1/06 | 29/598 |
| 5,339,064 A * | 8/1994 | Bessho | H01F 7/202 | 335/281 |
| 5,723,933 A * | 3/1998 | Grundl | H02K 3/04 | 310/208 |
| 5,731,645 A * | 3/1998 | Clifton | F16C 32/0459 | 310/178 |
| 5,838,087 A * | 11/1998 | Tang | H02K 19/103 | 310/168 |
| 6,153,959 A * | 11/2000 | Lorenzo | H02K 1/06 | 310/112 |
| 6,249,200 B1 * | 6/2001 | Stelter | C23C 14/35 | 335/299 |
| 6,285,104 B1 * | 9/2001 | Nashiki | H02K 1/165 | 310/184 |
| 6,359,358 B1 * | 3/2002 | Bae | H02K 1/146 | 310/113 |
| 8,159,104 B1 * | 4/2012 | Bojiuc | H02K 16/04 | 310/154.02 |
| 9,705,371 B2 * | 7/2017 | Muniz Casais | H02K 3/28 | |
| 9,934,897 B1 * | 4/2018 | VandenBerg | H01F 7/20 | |
| 2002/0047346 A1 * | 4/2002 | Miekka | B60L 50/50 | 310/68 B |
| 2002/0047448 A1 * | 4/2002 | Kawamura | B60K 6/26 | 310/181 |
| 2002/0125781 A1 * | 9/2002 | Bales | H02K 1/2793 | 310/156.35 |
| 2002/0175586 A1 * | 11/2002 | Hill | H02K 1/06 | 310/179 |
| 2003/0042815 A1 * | 3/2003 | Kinoshita | H02K 1/145 | 310/180 |
| 2004/0021437 A1 * | 2/2004 | Maslov | B60L 8/00 | 318/400.01 |
| 2004/0145266 A1 * | 7/2004 | Gladkov | H02K 3/28 | 310/180 |
| 2004/0207286 A1 * | 10/2004 | Bales | H02K 1/2793 | 310/268 |
| 2005/0073814 A1 * | 4/2005 | Tillotson | F28F 13/00 | 361/704 |
| 2005/0151438 A1 * | 7/2005 | Huang | H02K 3/28 | 310/180 |
| 2005/0156702 A1 * | 7/2005 | Marshall | H01F 38/08 | 336/214 |
| 2005/0174007 A1 * | 8/2005 | McClelland | H02K 1/06 | 310/216.121 |
| 2005/0211200 A1 * | 9/2005 | Liang | F01L 9/04 | 123/90.11 |
| 2006/0017347 A1 * | 1/2006 | Rahman | H02K 3/18 | 310/208 |
| 2006/0038454 A1 * | 2/2006 | Bojiuc | H02K 7/20 | 310/112 |
| 2006/0038456 A1 * | 2/2006 | Bojiuc | H02K 23/04 | 310/156.32 |
| 2006/0038460 A1 * | 2/2006 | Bojiuc | H02K 3/28 | 310/198 |
| 2007/0210884 A1 * | 9/2007 | Bird | H01F 7/202 | 335/80 |
| 2007/0216244 A1 * | 9/2007 | Edelson | F16C 32/0461 | 310/90.5 |
| 2008/0088200 A1 * | 4/2008 | Ritchey | H02K 16/00 | 310/268 |
| 2008/0157622 A1 * | 7/2008 | Shah | H02K 3/28 | 310/184 |
| 2008/0164779 A1 * | 7/2008 | Bojiuc | H02K 23/54 | 310/154.45 |
| 2008/0179981 A1 * | 7/2008 | Edelson | H02K 3/28 | 310/166 |
| 2009/0108969 A1 * | 4/2009 | Sims | A61N 2/006 | 335/300 |
| 2009/0315653 A1 * | 12/2009 | Suzuki | H01F 7/1205 | 335/185 |
| 2009/0322173 A1 * | 12/2009 | Bojiuc | H02K 1/06 | 310/156.01 |
| 2010/0001143 A1 * | 1/2010 | Bojiuc | B64C 39/001 | 244/23 R |
| 2010/0019589 A1 * | 1/2010 | Saban | H02K 1/02 | 310/52 |
| 2010/0038987 A1 * | 2/2010 | Kim | H02K 1/06 | 310/179 |
| 2010/0060206 A1 * | 3/2010 | Oki | H05H 7/04 | 315/503 |
| 2010/0214050 A1 * | 8/2010 | Opina, Jr. | H01F 17/045 | 336/192 |
| 2010/0289372 A1 * | 11/2010 | Taniguchi | H02K 3/28 | 310/195 |
| 2010/0304976 A1 * | 12/2010 | Overweg | G01R 33/381 | 505/162 |
| 2011/0198963 A1 * | 8/2011 | Tang | H02K 3/28 | 310/208 |
| 2012/0007458 A1 * | 1/2012 | Rozinsky | H02K 1/02 | 310/156.47 |
| 2012/0065073 A1 * | 3/2012 | Maher | G01R 33/3815 | 505/162 |
| 2012/0286592 A1 * | 11/2012 | Bojiuc | H02K 21/24 | 310/12.24 |
| 2013/0099882 A1 * | 4/2013 | Lee | H01F 5/02 | 335/299 |
| 2013/0264899 A1 * | 10/2013 | Goto | H02K 3/50 | 310/71 |
| 2013/0278102 A1 * | 10/2013 | Levy | H02K 16/00 | 310/114 |
| 2013/0328431 A1 * | 12/2013 | Teo | H02K 41/0356 | 310/154.02 |
| 2014/0084715 A1 * | 3/2014 | Yuan | H02K 41/03 | 310/46 |
| 2014/0191624 A1 * | 7/2014 | Jahshan | H02K 35/02 | 310/68 B |
| 2014/0232497 A1 * | 8/2014 | Sugita | H01F 7/202 | 335/213 |
| 2014/0285057 A1 * | 9/2014 | Aoyama | H02K 3/28 | 310/210 |
| 2014/0375160 A1 * | 12/2014 | Zhang | H02K 21/16 | 310/154.26 |
| 2015/0015354 A1 * | 1/2015 | Catalan | H01F 3/10 | 335/297 |
| 2015/0061450 A1 * | 3/2015 | Nakagawa | H02K 3/12 | 310/198 |
| 2015/0302967 A1 * | 10/2015 | Jenkins | H01F 7/1607 | 335/298 |
| 2015/0303780 A1 * | 10/2015 | Kim | H02K 21/12 | 310/68 B |
| 2016/0006311 A1 * | 1/2016 | Li | H02K 3/28 | 310/68 B |
| 2016/0013711 A1 * | 1/2016 | Wang | H02K 33/12 | 310/27 |
| 2016/0036308 A1 * | 2/2016 | Bailey | H02K 21/024 | 290/45 |
| 2016/0111192 A1 * | 4/2016 | Suzara | H01F 6/06 | 335/301 |
| 2016/0164361 A1 * | 6/2016 | Fukuyanagi | H02K 11/33 | 310/68 D |
| 2016/0241093 A1 * | 8/2016 | Patel | H02K 3/24 | |
| 2016/0248307 A1 * | 8/2016 | Kubota | H02K 16/02 | |
| 2016/0322870 A1 * | 11/2016 | Tanaka | H02K 3/12 | |
| 2016/0336841 A1 * | 11/2016 | Nagorny | H02K 19/103 | |
| 2016/0380503 A1 * | 12/2016 | Hauk | H02K 3/522 | 310/68 R |
| 2017/0018979 A1 * | 1/2017 | Kramer | H02K 53/00 | |
| 2017/0140860 A1 * | 5/2017 | Bitetto | H01F 7/064 | |
| 2017/0214285 A1 * | 7/2017 | Limanskiy | H02P 7/06 | |

(56) References Cited

U.S. PATENT DOCUMENTS

| | | | |
|---|---|---|---|
| 2017/0237306 A1* | 8/2017 | Juris | H02K 1/20 |
| | | | 310/52 |
| 2017/0353072 A1* | 12/2017 | McSheery | H02K 3/32 |
| 2018/0034332 A1* | 2/2018 | Takahashi | H02K 21/14 |
| 2018/0152089 A1* | 5/2018 | Umehara | H01F 7/20 |
| 2018/0205279 A1* | 7/2018 | Linares | H02K 3/28 |
| 2018/0212486 A1* | 7/2018 | Hunstable | H02K 1/2793 |
| 2018/0233990 A1* | 8/2018 | Vu | H02K 11/33 |
| 2018/0337581 A1* | 11/2018 | Linares | H02K 23/30 |
| 2019/0020227 A1* | 1/2019 | Umemori | H02K 3/28 |

* cited by examiner

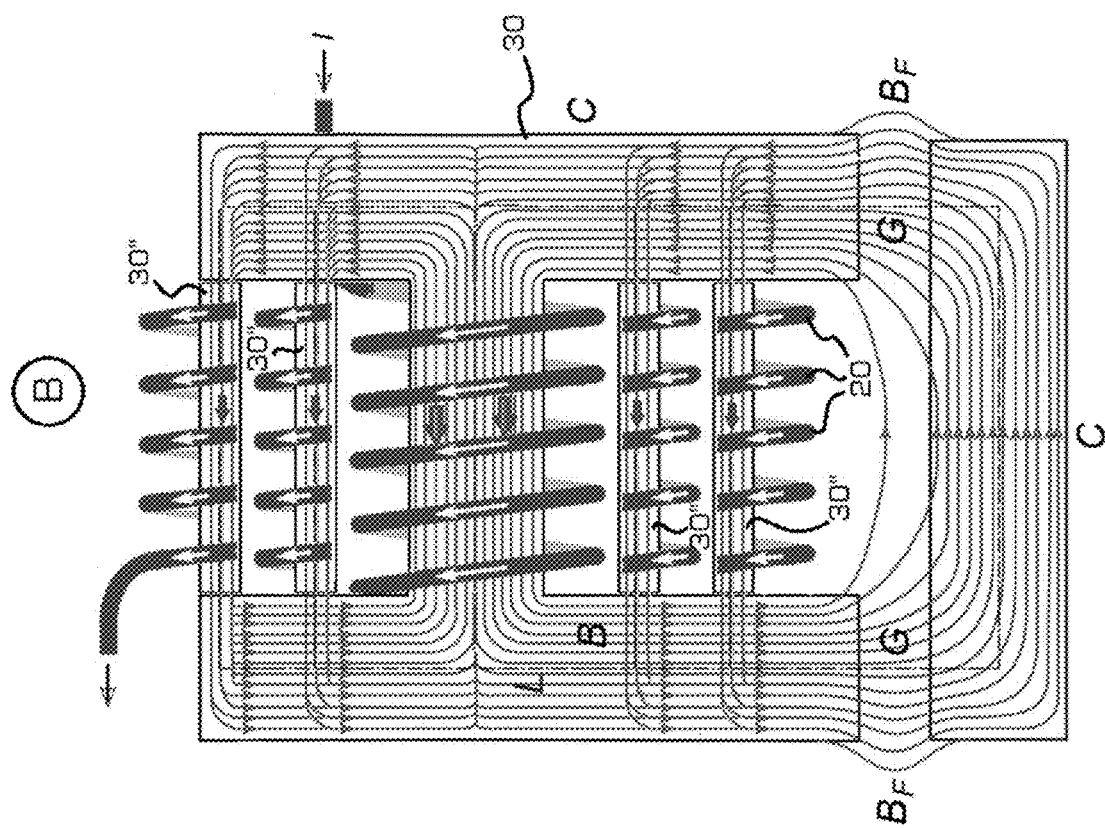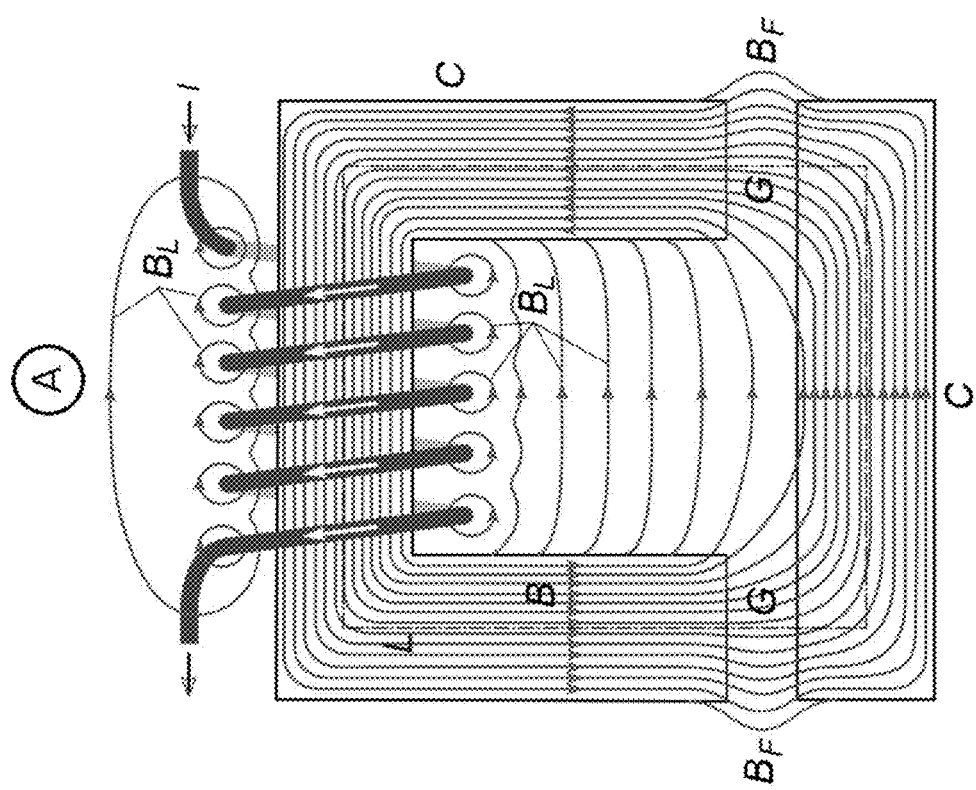
Fig.9

VARIABLE MAGNETIC MONOPOLE FIELD ELECTRO-MAGNET AND INDUCTOR

CROSS REFERENCE TO RELATED APPLICATION

This application claims the benefit of U.S. provisional patent application 62/364,319, filed Jul. 20, 2016, and which is incorporated by reference herein.

FIELD OF INVENTION

The invention relates generally to the art of electromagnets and inductors used in electric motors and generators, transformers and other electromechanical actuator machines. More particularly, the invention relates to a superior concentration equally distributed magnetic field over the entire electromagnet's generated magnetic pole face or surface with a controllable magnetic field strength and polarity amplitude through the combination of the parallel, series and/or independent winding connection system of the same coil and having interleaved laminated supportive ferromagnetic material cores between the windings layers.

BACKGROUND

As we know today, by definition, an electromagnet is a type of magnet in which the magnetic field is produced by the flow of the electric current. The magnetic field disappears when the current is turned off. A simple electromagnet consisting of a coil of insulated wire wrapped around an iron core. The strength of magnetic field generated is proportional to the amount of current. Current (I) through a wire produces a magnetic field (B). The field is oriented according to the right-hand rule.

An electric current flowing in a wire creates a magnetic field around the wire. To concentrate the magnetic field, in an electromagnet the wire is wound into a coil with many turns of wire lying side by side. The magnetic field of all the turns of wire passes through the center of the coil, creating a strong magnetic field there. A coil forming the shape of a straight tube (a helix) is called a solenoid. Much stronger magnetic fields can be produced if a "core" of ferromagnetic material, such as soft iron, is placed inside the coil. The ferromagnetic core increases the magnetic field to thousands of times the strength of the field of the coil alone, due to the high magnetic permeability β of the ferromagnetic material. This is called a ferromagnetic-core or iron-core electromagnet.

The main advantage of an electromagnet over a permanent magnet is that the magnetic field can be rapidly manipulated over a wide range of expected data by controlling the amount of electric current. However, a continuous supply of electrical energy is required to maintain the field.

Danish scientist Hans Christian Ørsted discovered in 1820 that electric currents create magnetic fields. British scientist William Sturgeon invented the electromagnet in 1824. His first electromagnet was a horseshoe-shaped piece of iron that was wrapped with about 18 turns of bare copper wire (insulated wire didn't exist yet). The iron was varnished to insulate it from the windings. When a current was passed through the coil, the iron became magnetized and attracted other pieces of iron; when the current was stopped, it lost magnetization. Sturgeon displayed its power by showing that although it only weighed seven ounces (roughly 200 grams), it could lift nine pounds (roughly 4 kilos=4,000 grams) when the current of a single-cell battery was applied. However, Sturgeon's magnets were weak because the uninsulated wire he used could only be wrapped in a single spaced out layer around the core, limiting the number of turns. Beginning in 1827, US scientist Joseph Henry systematically improved and popularized the electromagnet. By using wire insulated by silk thread he was able to wind multiple layers of wire on cores, creating powerful magnets with thousands of turns of wire, including one that could support 2,063 lb. (936 kg). The first major use for electromagnets was in telegraph sounders.

The magnetic domain theory of how ferromagnetic cores work was first proposed in 1906 by French physicist Pierre-Ernest Weiss, and the detailed modern quantum mechanical theory of ferromagnetism was worked out in the 1920s by Werner Heisenberg, Lev Landau, Felix Bloch and others. Electromagnets are very widely used in electric and electromechanical devices, including:

- Motors and generators either rotating or linear
- Transformers
- Electromechanical actuators
- Relays, including reed relays originally used in telephone exchanges
- Electric bells
- Loudspeakers
- Magnetic recording and data storage equipment: tape recorders, VCRs, hard disks
- Scientific and medical instruments such as MRI machines and mass spectrometers
- Particle accelerators
- Magnetic locks
- Magnetic separation of material
- Industrial lifting magnets
- Electromagnetic suspension used for MAGLEV trains With reference to FIG. 11, a conventional magnetic circuit, showing a constant B field approximation is shown.

Magnetic field (green) of a typical electromagnet, with the iron core C forming a closed loop with two air gaps G in it. Most of the magnetic field B is concentrated in the core. However some of the field lines $B_L$, called the "leakage flux", do not follow the full core circuit and so do not contribute to the force exerted by the electromagnet. In the gaps G the field lines spread out beyond the boundaries of the core in "fringing fields" $B_F$. This increases the "resistance" (reluctance) of the magnetic circuit, decreasing the total magnetic flux in the core. Both the leakage flux and the fringing fields get larger as the gaps are increased, reducing the force exerted by the magnet. Line L shows the average length of the magnetic circuit, used in equation (1) below. It is the sum of the length $L_{core}$ in the iron core and the length $L_{gap}$ in the air gaps In many practical applications of electromagnets, such as motors, generators, transformers, lifting magnets, and loudspeakers, the iron core is in the form of a loop or magnetic circuit, possibly broken by a few narrow air gaps. This is because iron presents much less "resistance" (reluctance) to the magnetic field than air, so a stronger field can be obtained if most of the magnetic field's path is within the core.

Since most of the magnetic field is confined within the outlines of the core loop, this allows a simplification of the mathematical analysis. See the drawing above. The prior art's typical electromagnet approach and limitation includes field lines that encircle the wire windings but do not enter the core. This is called "leakage flux". Therefore the equations in this section are valid and practically possible for electromagnets for which:

the magnetic circuit is a single loop of core material, possibly broken by a few air gaps the core has roughly the same cross sectional area throughout its length.

any air gaps between sections of core material are not large compared with the cross sectional dimensions of the core.

there is negligible leakage flux

The main nonlinear feature of ferromagnetic materials used in the prior art winding concept of electromagnets is that the B field saturates at a certain value, which is around 1.6 teslas (T) for most high permeability core steels. The B field increases quickly with increasing current up to that value, but above that value the field levels off and becomes almost constant, regardless of how much current is sent through the windings. So the strength of the magnetic field possible from an iron core electromagnet is limited to around 1.6 to 2 T.

Magnetic Field Created by a Current

The magnetic field created by an electromagnet is proportional to both the number of turns in the winding, N, and the current in the wire, I, hence this product, NI, in ampere-turns, is given the name magnetomotive force. For an electromagnet with a single magnetic circuit per ferromagnetic material support, of which length $L_{core}$ is in the core material and length $L_{gap}$ is in air gaps, Ampere's Law reduces to:

$$NI = H_{core}L_{core} + H_{gap}L_{gap} \quad (1)$$

$$NI = B\left(\frac{L_{core}}{\mu} + \frac{L_{gap}}{\mu_0}\right)$$

where $\mu = B/H$ $\mu_0 = 4\pi(10^{-7})$ N·A$^{-2}$ is the permeability of free space (or air); note that A in this definition is amperes.

This is a nonlinear equation, because the permeability of the core, $\mu$, varies with the magnetic field B. For an exact solution, the value of $\mu$ at the B value used must be obtained from the core material hysteresis curve. If B is unknown, the equation must be solved by numerical methods. However, if the magneto-motive force is well above saturation, so the core material is in saturation, the magnetic field will be approximately the saturation value $B_{sat}$ for the material, and won't vary much with changes in NI. For a closed magnetic circuit (no air gap) most core materials saturate at a magnetomotive force of roughly 800 ampere-turns per meter of flux path.

For most core materials, $\mu_r = \mu/\mu_0 \approx 2000\text{-}6000$. So in equation (1) above, the second term dominates. Therefore, in magnetic circuits with an air gap, the strength of the magnetic field B depends strongly on the length of the air gap, and the length of the flux path in the core doesn't matter much.

Force Exerted by Magnetic Field

The force exerted by an electromagnet on a section of core material is:

$$F = \frac{B^2 A}{2\mu_0} \quad (2)$$

The 1.6 T limit on the field mentioned above sets a limit on the maximum force per unit core area, or pressure, an iron-core electromagnet can exert; roughly:

$$\frac{F}{A} = \frac{B_{sat}^2}{2\mu_0} \approx 1000 \text{ kPa} = 10^6 \text{ N/m}^2 = 145 \text{ lbf} \cdot \text{in}^{-2}$$

In more intuitive units it's useful to remember that at 1T the magnetic pressure is approximately 4 atmospheres, or kg/cm$^2$.

Given core geometry, the B field needed for a given force can be calculated from (2); if it comes out to much more than 1.6 T, a larger core must be used.

Closed Magnetic Circuit

For a closed magnetic circuit (no air gap), such as would be found in an electromagnet lifting a piece of iron bridged across its poles, equation (1) becomes:

$$B = \frac{NI\mu}{L} \quad (3)$$

Substituting into (2), the force is:

$$F = \frac{\mu^2 N^2 I^2 A}{2\mu_0 L^2} \quad (4)$$

It can be seen that to maximize the force, a core with a short flux path L and a wide cross sectional area A is preferred. To achieve this, in applications like lifting magnets and loudspeakers a flat cylindrical design is often used. The winding is wrapped around a short wide cylindrical core that forms one pole, and a thick metal housing that wraps around the outside of the windings forms the other part of the magnetic circuit, bringing the magnetic field to the front to form the other pole.

Force Between Electromagnets

The above methods are inapplicable when most of the magnetic field path is outside the core. For electromagnets (or permanent magnets) with well defined 'poles' where the field lines emerge from the core, the force between two electromagnets can be found using the 'Gilbert model' which assumes the magnetic field is produced by fictitious 'magnetic charges' on the surface of the poles, with pole strength m and units of Ampere-turn meter. Magnetic pole strength of electromagnets can be found from:

$$m = \frac{NIA}{L}$$

The force between two poles is:

$$F = \frac{\mu_0 m_1 m_2}{4\pi r^2}$$

This model doesn't give the correct magnetic field inside the core, and thus gives incorrect results if the pole of one magnet gets too close to another magnet.

Side Effects in Large Prior Art Concept Electromagnets

There are several side effects which become important in large prior art concept electromagnets and must be provided for in their design, as described below.

Ohmic Heating

The only power consumed in a DC electromagnet is due to the resistance of the windings, and is dissipated as heat. Some large electromagnets require cooling water circulating through pipes in the windings to carry off the waste heat.

Since the magnetic field is proportional to the product NI, the number of turns in the windings N and the current I can be chosen to minimize heat losses, as long as their product is constant. Since the power dissipation, $P=I^2R$, increases with the square of the current but only increases approximately linearly with the number of windings, the power lost in the windings can be minimized by reducing I and increasing the number of turns N proportionally. For example halving I and doubling N halves the power loss. This is one reason most electromagnets have windings with many turns of wire.

However, the limit to increasing N is that the larger number of windings takes up more room between the magnet's core pieces. If the area available for the windings is filled up, more turns require going to a smaller diameter of wire, which has higher resistance, which cancels the advantage of using more turns. So in large prior art magnets there is a minimum amount of heat loss that can't be reduced. This increases with the square of the magnetic flux $B^2$.

Inductive Voltage Spikes

An electromagnet is a large inductor, and resists changes in the current through its windings. Any sudden change in the winding current cause large voltage spikes across the windings. This is because when the current through the magnet is increased, such as when it is turned on, energy from the circuit must be stored in the magnetic field. When it is turned off the energy in the field is returned to the circuit.

If an ordinary switch is used to control the winding current, this can cause sparks at the terminals of the switch. This doesn't occur when the magnet is switched on, because the voltage is limited to the power supply voltage. But when it is switched off, the energy in the magnetic field is suddenly returned to the circuit, causing a large voltage spike and an arc across the switch contacts, which can damage them. With small electromagnets a capacitor is often used across the contacts, which reduces arcing by temporarily storing the current. More often a diode is used to prevent voltage spikes by providing a path for the current to recirculate through the winding until the energy is dissipated as heat. The diode is connected across the winding, oriented so it is reverse-biased during steady state operation and doesn't conduct. When the supply voltage is removed, the voltage spike forward-biases the diode and the reactive current continue to flow through the winding, through the diode and back into the winding. A diode used in this way is called a flyback diode.

Large electromagnets are usually powered by variable current electronic power supplies, controlled by a microprocessor, which prevent voltage spikes by accomplishing current changes slowly, in gentle ramps. It may take several minutes to energize or de-energize a large magnet.

Lorentz Forces

In powerful state of the art and all the prior art concept electromagnets, the magnetic field exerts a force on each turn of the windings, due to the Lorentz force $qv \times B$ acting on the moving charges within the wire. The Lorentz force is perpendicular to both the axis of the wire and the magnetic field. It can be visualized as a pressure between the magnetic field lines, pushing them apart. It has two effects on an electromagnet's windings:

- The field lines within the axis of the coil exert a radial force on each turn of the windings, tending to push them outward in all directions. This causes a tensile stress in the wire.
- The leakage field lines between each turn of the coil exert a repulsive force between adjacent turns, tending to push them apart.

The Lorentz forces increase with $B^2$. In large electromagnets the windings must be firmly clamped in place, to prevent motion on power-up and power-down from causing metal fatigue in the windings. In the Bitter design, below, used in very high field research magnets, the windings are constructed as flat disks to resist the radial forces, and clamped in an axial direction to resist the axial ones.

Core Losses

In alternating current (AC) electromagnets, used in transformers, inductors, and AC motors and generators, the magnetic field is constantly changing. This causes energy losses in their magnetic cores that are dissipated as heat in the core. The losses stem from two processes:

First, Eddy currents: From Faraday's law of induction, the changing magnetic field induces circulating electric currents inside nearby conductors, called eddy currents. The energy in these currents is dissipated as heat in the electrical resistance of the conductor, so they are a cause of energy loss. Since the electromagnet's iron core is conductive, and most of the magnetic field is concentrated there, eddy currents in the core are the major problem. Eddy currents are closed loops of current that flow in planes perpendicular to the magnetic field. The energy dissipated is proportional to the area enclosed by the loop. To prevent them, the cores of AC electromagnets are made of stacks of thin steel sheets, or laminations, oriented parallel to the magnetic field, with an insulating coating on the surface. The insulation layers prevent eddy current from flowing between the sheets. Any remaining eddy currents must flow within the cross section of each individual lamination, which reduces losses greatly. Another alternative is to use a ferrite core, which is a nonconductor.

Second, Hysteresis losses: Reversing the direction of magnetization of the magnetic domains in the core material each cycle causes energy loss, because of the coercivity of the material. These losses are called hysteresis. The energy lost per cycle is proportional to the area of the hysteresis loop in the wells known BH graph. To minimize this loss, magnetic cores used in transformers and other AC electromagnets are made of "soft" low coercivity materials, such as silicon steel or soft ferrite.

The energy loss per cycle of the AC current is constant for each of these processes, so the power loss increases linearly with frequency.

High Field Electromagnets

Superconducting Electromagnets

The most powerful electromagnet in the world, the 45 T hybrid Bitter-superconducting magnet at the US National High Magnetic Field Laboratory, Tallahassee, Fla., USA.

When a magnetic field higher than the ferromagnetic limit of 1.6 T is needed, superconducting electromagnets can be used. Instead of using ferromagnetic materials, these use superconducting windings cooled with liquid helium, which conduct current without electrical resistance. These allow enormous currents to flow, which generate intense magnetic fields. Superconducting magnets are limited by the field strength at which the winding material ceases to be superconducting. Current designs are limited to 10-20 T, with the current (2009) record of 33.8 T. The necessary refrigeration equipment and cryostat make them much more expensive than ordinary electromagnets. However, in high power applications this can be offset by lower operating costs, since after startup no power is required for the windings, since no energy is lost to Ohmic heating. They are used in particle accelerators, MRI machines, and research.

Bitter Electromagnets

Both iron-core and superconducting electromagnets have limits to the field they can produce. Therefore the most powerful man-made magnetic fields have been generated by air-core non-superconducting electromagnets of a design invented by Francis Bitter in 1933, called Bitter electromagnets. Instead of wire windings, a Bitter magnet consists of a solenoid made of a stack of conducting disks, arranged so that the current moves in a helical path through them. This design has the mechanical strength to withstand the extreme Lorentz forces of the field, which increase with $B^2$. The disks are pierced with holes through which cooling water passes to carry away the heat caused by the high current. The strongest continuous field achieved with a resistive magnet is currently (2008) 35 T, produced by a Bitter electromagnet. The strongest continuous magnetic field, 45 T, was achieved with a hybrid device consisting of a Bitter magnet inside a superconducting magnet.

Exploding Electromagnets

The factor limiting the strength of electromagnets is the inability to dissipate the enormous waste heat, so more powerful fields, up to 100 T, have been obtained from resistive magnets by sending brief pulses of current through them. The most powerful manmade magnetic fields have been created by using explosives to compress the magnetic field inside an electromagnet as it is pulsed. The implosion compresses the magnetic field to values of around 1000 T for a few microseconds. While this method may seem very destructive there are methods to control the blast so that neither the experiment nor the magnetic structure is harmed, by redirecting the brunt of the force radially outwards. These devices are known as destructive pulsed electromagnets. They are used in physics and materials science research to study the properties of materials at high magnetic fields.

SUMMARY AND OBJECTS OF INVENTION

The variable magnetic monopole field electro-magnet and inductor according to the present disclosure overcome the drawbacks of known electro-magnets and inductors as follows.

The present invention provides a novel winding arrangement for the needed electromagnets and inductors used in different applications.

The invention provides a superior concentration and equally distributed magnetic field over the entire electromagnet's face or surface with a desired controllable magnetic field strength and polarity amplitude.

The present invention provides an electromagnet and inductor with independent winding arrangement that represents a clear separation from the rest of the same coil winding layers by having an interleaved laminated supportive ferromagnetic material core in between each windings layer.

The present invention provides an electromagnet and inductor with a controllable magnetic field strength, polarity and amplitude through the combination of the parallel, series and/or independent winding connection system of the same coil.

The present invention provides an electromagnet and inductor without both "the leakage flux" and "the fringing fields" that reduces the overall force exerted by the magnet.

The present invention provides an electromagnet and inductor with an equal distribution number of the winding turns over the ferromagnetic core in any portion of the same coil.

The present invention provides an electromagnet and inductor with an equal distribution of the magnetic field strength over the ferromagnetic core in any portion of the same coil.

The present invention provides an electromagnet and inductor with a controlled variable magnetic polarity of the two ends of the said electromagnet from monopole field effect North-North or South-South to bipolar North-South different or equal distribution over the ferromagnetic core in any portion of the same coil.

The present invention provides an electromagnet and inductor to protect the windings of the same coil when any sudden change in the winding current tends to cause large voltage spikes across the windings.

The present invention provides an electromagnet and inductor to protect the windings of the same coil when the current through the electromagnet is increased, such as when it is turned on, and the applied energy from the circuit as a result is stored in the magnetic field.

The present invention provides an electromagnet and inductor to eliminate the Lorentz forces.

The present invention provides an electromagnet and inductor to eliminate the Eddy currents inside nearby conductors.

The present invention provides an electromagnet and inductor to limit and/or completely eliminate the wire specific skin effect under certain or any operating voltage, currents and frequencies.

The present invention provides an electromagnet and inductor to eliminate the Hysteresis losses in each individual ferromagnetic core lamination.

The present invention provides an electromagnet and inductor to eliminate the loses in the ferromagnetic core lamination by capturing the circulating Eddy currents and reintroduce them in the power supply circuit or use it as a secondary or primary inductive winding and electrical circuit.

The present invention provides an electromagnet and inductor to generate and capture induced electromagnetic forces and by overlapping two or more coils to be used as a multiple functional power transformer.

Other features and aspects of the present invention are provided by various combinations and sub combinations of the disclosed elements, as well as methods of practicing same, which are discussed in greater detail below. Embodiments, examples, features, aspects, and advantages of the present disclosure will become better understood with regard to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIG. 1 *b* is a perspective view of the FIG. 1 assembly showing an exploded inner detailed arrangement;

FIG. 5 b is a schematic electrical circuit front vertical cross view assembly of the present invention showing a second alternate energizing mode;

FIG. 5 c is a schematic electrical circuit front vertical cross view assembly of the present invention showing a third alternate energizing mode;

FIG. 5 d is a schematic electrical circuit front vertical cross view assembly of the present invention showing a fourth alternate energizing mode;

FIG. 6 b is a schematic electrical circuit front vertical cross view assembly of the present invention showing a second variation of several variations of simple and double connected parallel wound numbers of wires plus different shape, type and specifically designed magnetic and nonmagnetic housing enclosures and supports;

FIG. 6 c is a schematic electrical circuit front vertical cross view assembly of the present invention showing a third variation of several variations of simple and double connected parallel wound numbers of wires plus different shape, type and specifically designed magnetic and nonmagnetic housing enclosures and supports;

FIG. 7 b is an alternate preferred embodiment showing a variation of magnetic field outputs along the linear path when each electromagnet is specifically energized;

FIG. 7 c is an alternate preferred embodiment showing a variation of magnetic field outputs along the linear path when each electromagnet is specifically energized;

FIG. 8 b is an alternate preferred embodiment, similar to the FIG. 1 embodiment, showing an alternate shape, number and size of interleaved ferromagnetic laminations;

FIG. 9 a is a view of a conventional transformer 9 a and the preferred embodiment 9 b of the present invention transformer showing the closed magnetic field path through the interleaved ferromagnetic laminations as the coils support;

FIG. 9 b is a comparison view the conventional transformer of FIG. 9 a showing a preferred embodiment of the present invention transformer with the closed magnetic field path through the interleaved ferromagnetic laminations as the coils support;

Figure 1:
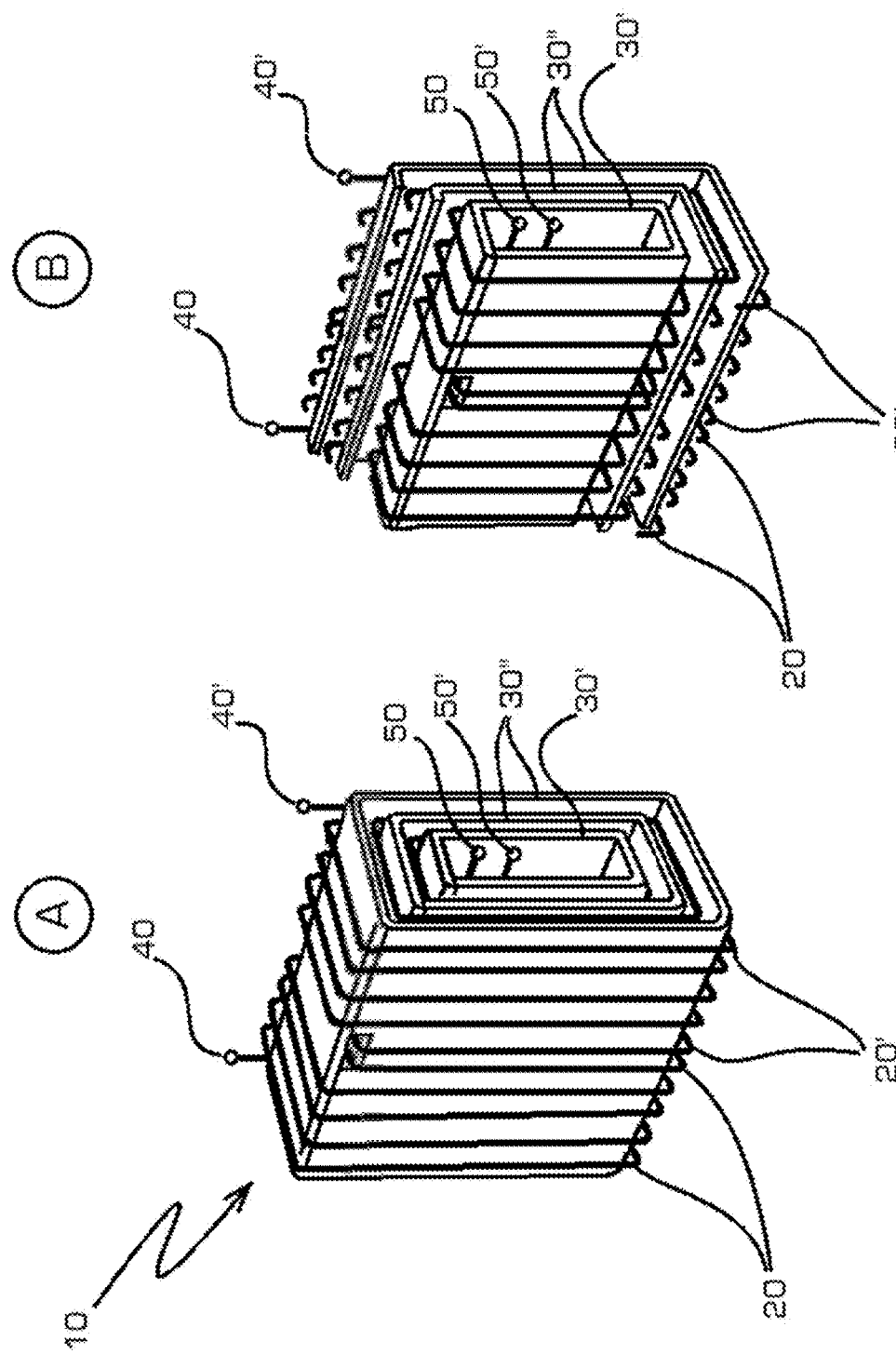
FIG. 1 *a* is a perspective view of an example assembly of the present invention herein described.
Figure 2:
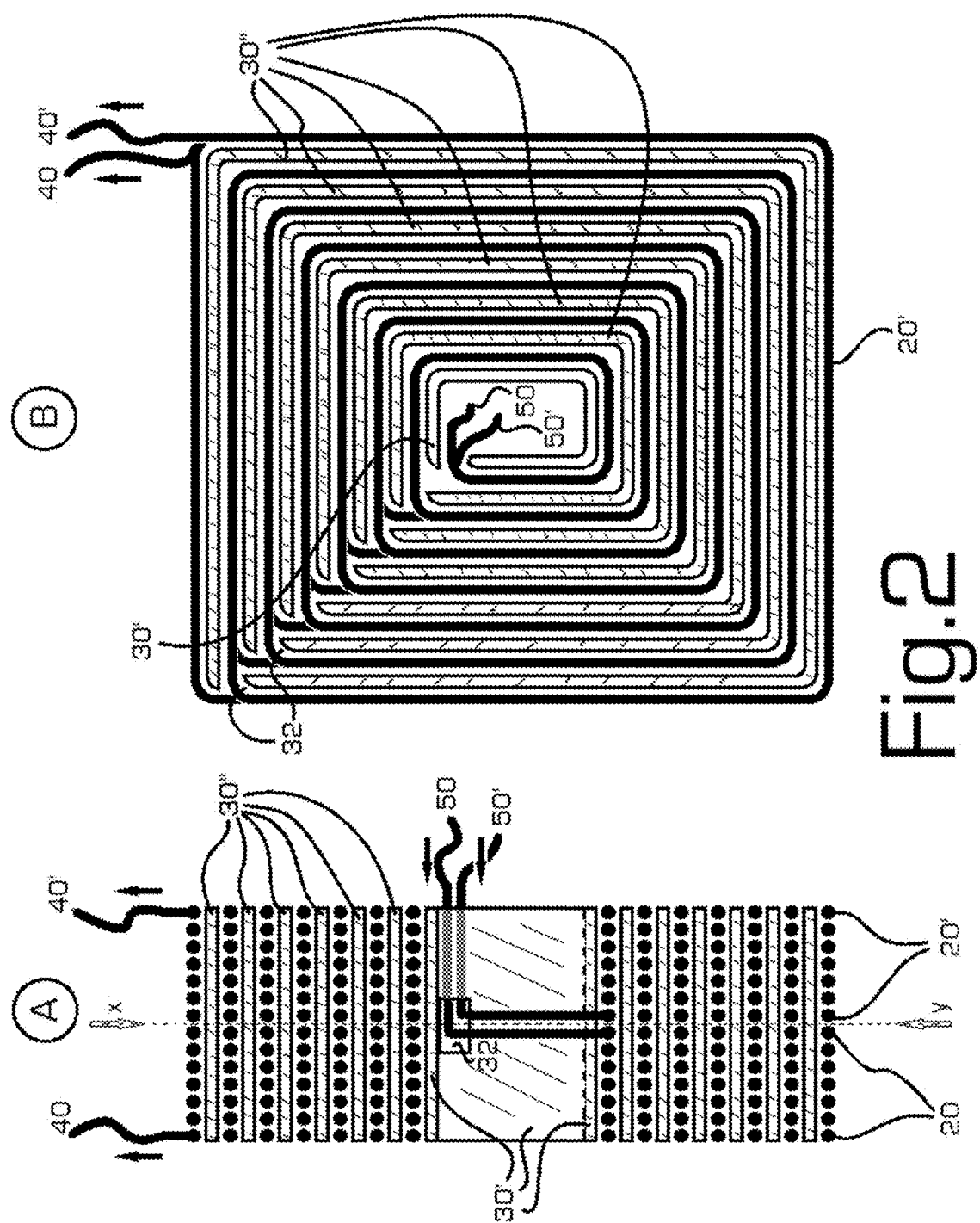
FIG. 2 is a front and side vertical cross view of the FIG. 1 assembly.
Figure 3:
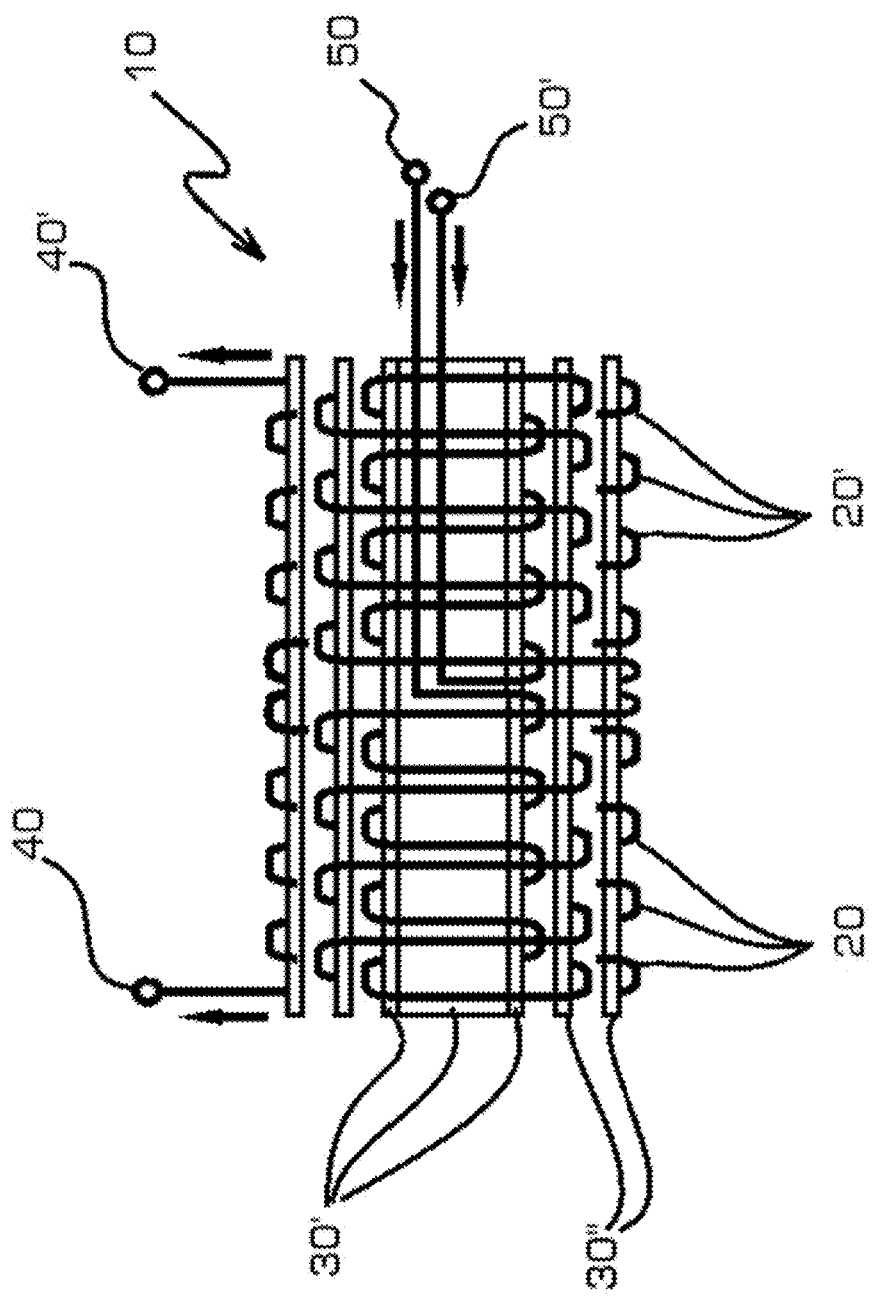
FIG. 3 is a vertical cross view of the FIG. 2 assembly showing the details of the double counter mirror winding direction over the interleaved common ferromagnetic lamination support arrangement of the preferred embodiment of the present invention.
Figure 4:
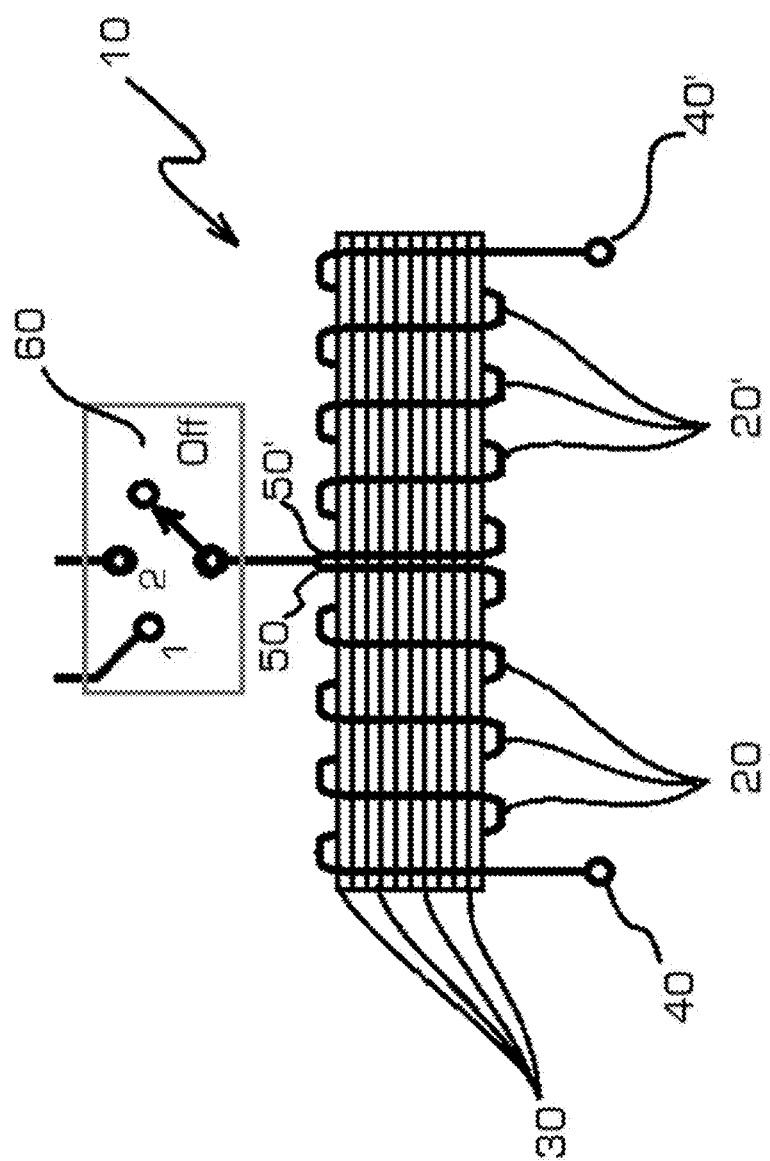
FIG. 4 is a symbolic or generic schematic representation of the electrical circuit front vertical cross view of the FIG. 3 VMMFE multilayer series-parallel winding assembly of the present invention.
Figure 5:
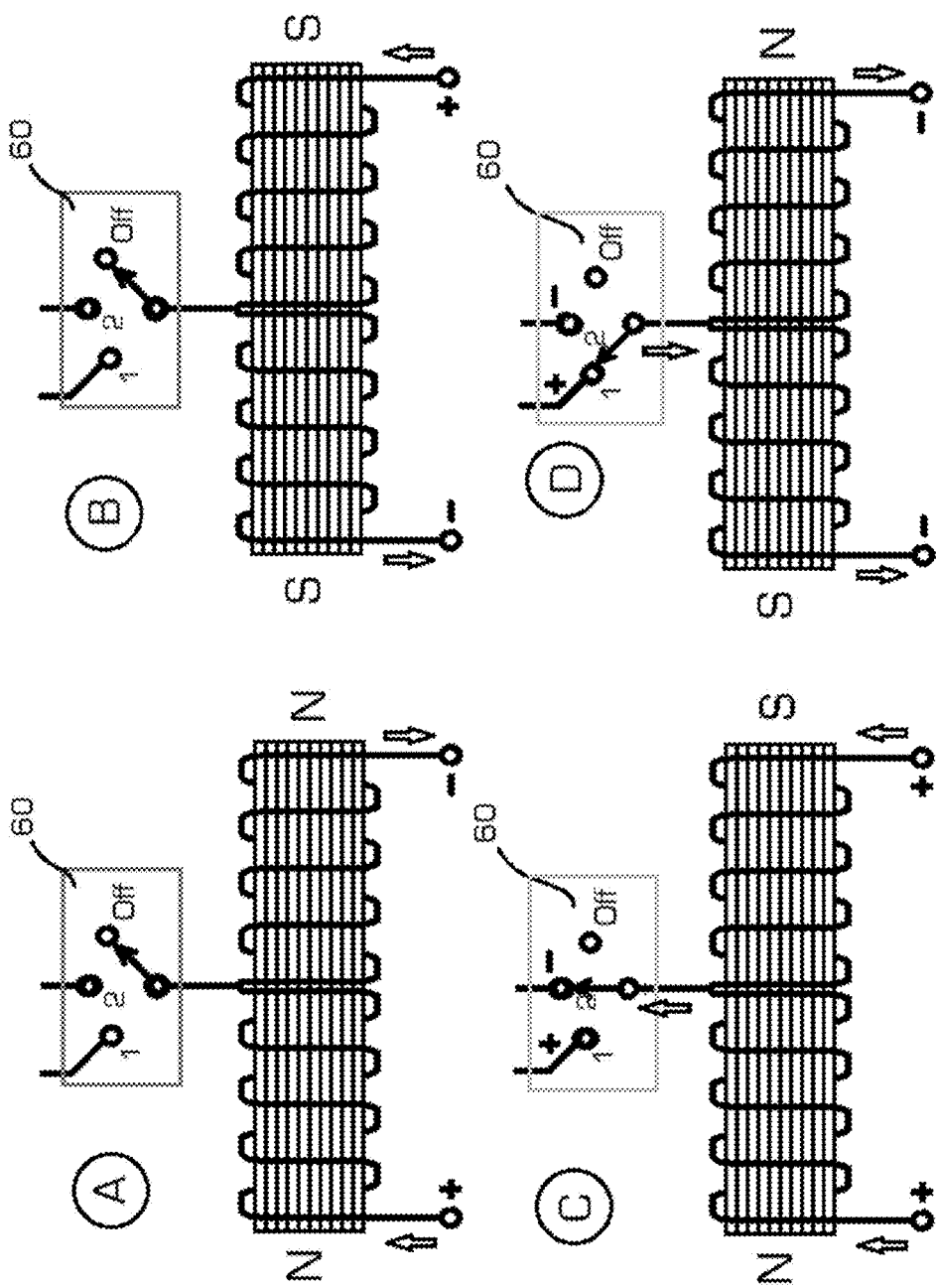
FIG. 5 a is a schematic electrical circuit front vertical cross view assembly of the present invention showing a first alternate mode of several different energizing modes in order to get different magnetic polarities at each ferromagnetic core's end of the electromagnet of the present invention.
Figure 6:
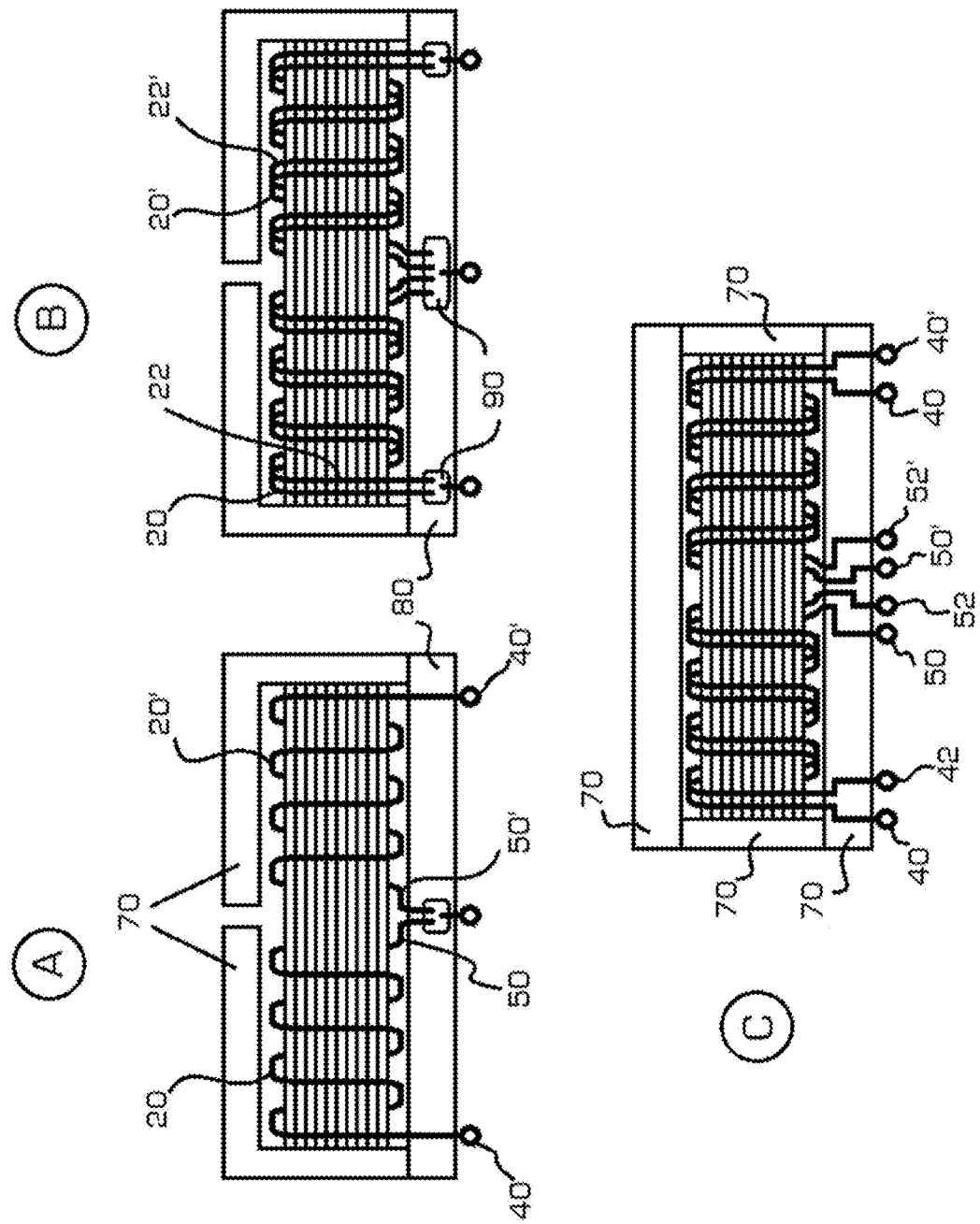
FIG. 6 a is a schematic electrical circuit front vertical cross view assembly of the present invention showing a first variation of several variations of simple and double connected parallel wound numbers of wires plus different shape, type and specifically designed magnetic and nonmagnetic housing enclosures and supports.
Figure 7:
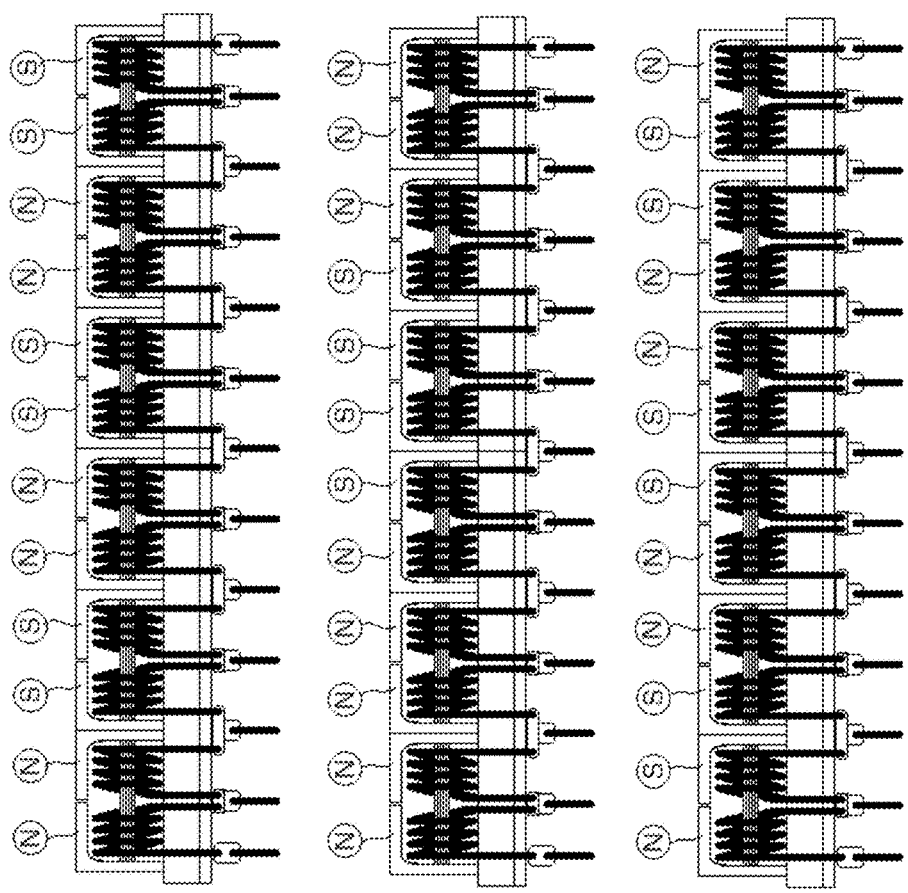
FIG. 7 a is a view of a preferred embodiment showing variation of magnetic field outputs along a linear path when each electromagnet is specifically energized.
Figure 8:
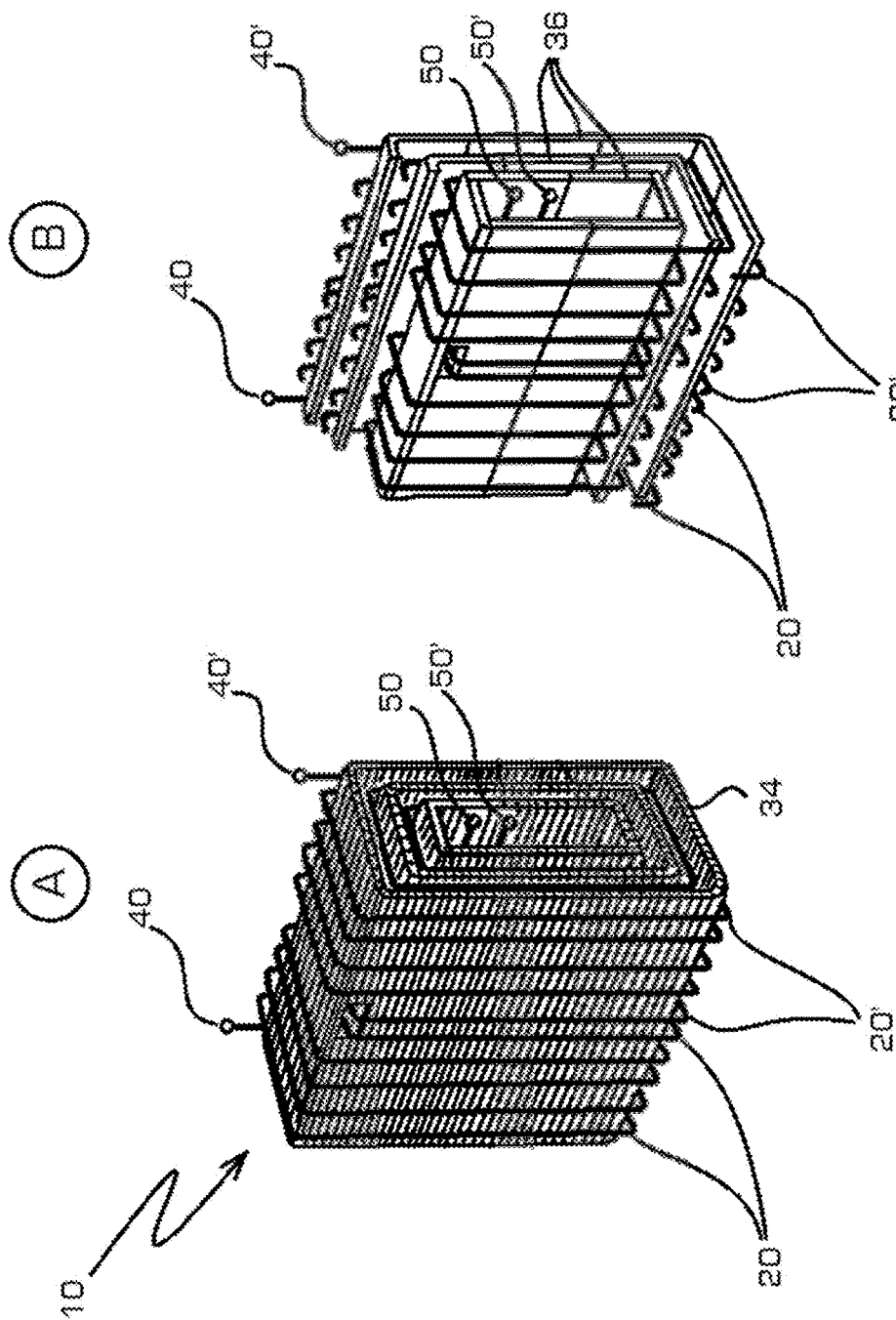
FIG. 8 a is a perspective view of an alternate preferred embodiment, similar to the FIG. 1 embodiment, of the present invention showing an alternate shape, number and size of interleaved ferromagnetic laminations.
Figure 10:
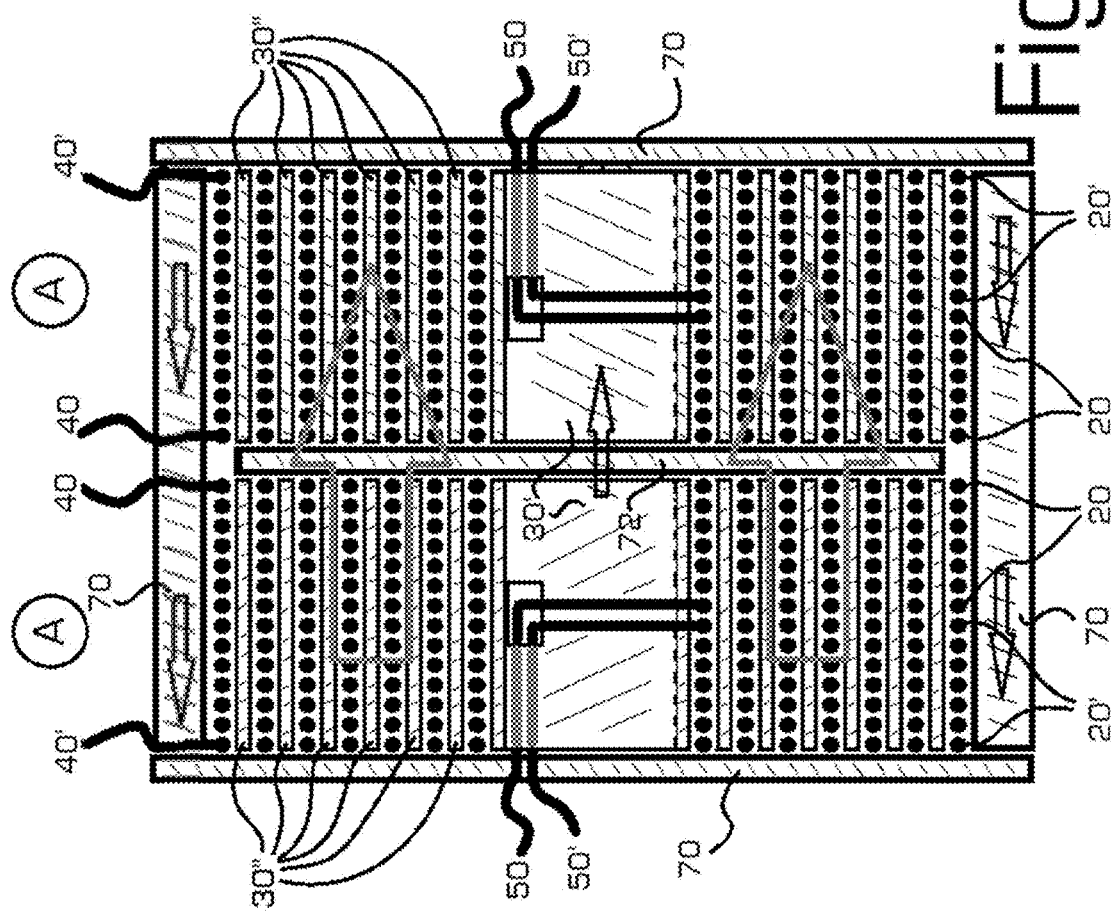
FIG. 10 is a vertical cross view, of the preferred embodiment of a transformer showing the added preferred different shape, number and sizes of the interleaved ferromagnetic laminations; and, FIG. 11 shows a conventional magnetic circuit, having a constant B field approximation.
Figure 11:
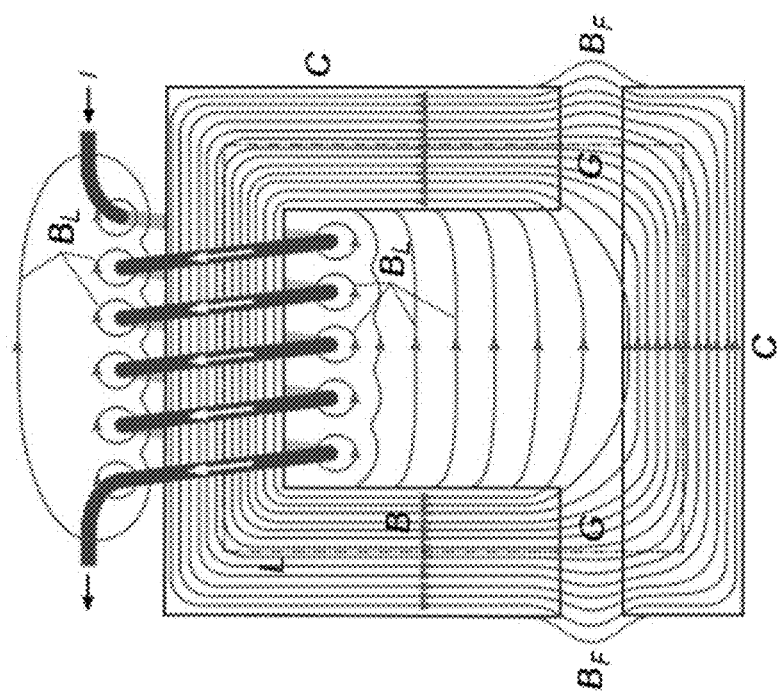

Reference symbols or names are used in the Figures to indicate certain components, aspects or features shown therein. Reference symbols common to more than one Figure indicate like components, aspects or features shown therein.

DETAILED DESCRIPTION OF INVENTION

A full and enabling disclosure of the present invention, including the best mode thereof; to one skilled in the art, is set forth more particularly in the reminder of the specification, including reference to the accompanying drawings, in which the reference numerals refer to various structural and other features of the preferred embodiment as follows:

10—General view of the preferred embodiment;
20—Winding layer sharing the same ferromagnetic interleaved lamination support with its mirrored counterpart #20';
20'—Mirrored winding layer sharing the same ferromagnetic interleaved lamination support with winding #20;
30—Ferromagnetic lamination core support for each winding layer;
40—The external end lead of #20 winding layer;
40'—The external end lead of the mirrored #20' winding layer;
50—The starting point lead of the winding #20;
50'—The starting point lead of the winding #20';
60—Three position commutator panel;
70—Ferromagnetic material core housing;
80—Non-ferromagnetic support (can be either metallic or non-metallic material);
90—Bus-bar connector.

A High Concentration Variable Parallel Magnetic Monopole Field Electromagnet and Inductor, referring now to FIG. 1, assembly 10 with multilayer series-parallel wound wire layers 20 and 20' over a multiple number of space apart interleaved common ferromagnetic core support lamination strips 30" may have an inner or central starting point from the leads 50 and 50' for the first layer over the first ferromagnetic lamination support 30' and continuing on an opposed winding direction as a mirrored embodiment continuing to build by repetition up again and again until it reaches the decided number of layers and the entire coil' size and electromagnetic value becomes as projected for the end user's needs.

It is to be understood by one of ordinary skill in the art that the present discussion is a description of exemplary embodiments only, and is not intended as limiting the broader aspects of the present invention, which broader aspects are embodied in the exemplary constructions.

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

What is claimed is:

1. A variable magnetic monopole field electro-magnet and inductor comprising:
   a plurality of mirrored pairs of high density magnetic field windings including interleaved, laminated ferromagnetic supportive cores positioned between said mirrored pairs of windings;
   each field winding of one of said mirrored pairs of field windings having a number of windings equal to the number of windings as had by the other of the mirrored pair; and,
   each field winding of one of said mirrored pairs of field windings having field strength equal to the field strength of the other of the mirrored pair.

2. The variable magnetic monopole field electro-magnet and inductor of claim 1 further comprising the field windings being double counter wound.

3. The variable magnetic monopole field electromagnet and inductor of claim 1 further comprising the field windings positioned over the interleaved, laminated ferromagnetic supportive cores.

4. The variable magnetic monopole field electromagnet and inductor of claim 1 wherein Eddy currents inside nearby conductors are eliminated.

5. The variable magnetic monopole field electromagnet and inductor of claim 1 wherein wire specific skin effect is eliminated.

6. The variable magnetic monopole field electromagnet and inductor of claim 1 wherein Hysteresis losses in individual ferromagnetic core laminations is eliminated.

7. The variable magnetic monopole field electromagnet and inductor of claim 1 wherein said mirrored pairs of windings capture induced electromagnetic forces.

8. The variable magnetic monopole field electromagnet and inductor of claim 1 wherein said mirrored pairs of windings are positioned in a double counter direction.

9. The variable magnetic monopole field electromagnet and inductor of claim 1 wherein the interleaved ferromagnetic laminations may vary in one or more of shape, number and size.

10. The variable magnetic monopole field electromagnet and inductor of claim 1 wherein a closed magnetic field is formed through said interleaved laminated ferromagnetic cores.

11. The variable magnetic monopole field electromagnet and inductor of claim 1 wherein said mirrored pairs of windings share the same lamination support.

12. The variable magnetic monopole field electromagnet and inductor of claim 1 wherein each winding layer has a ferromagnetic lamination core support.

13. The variable magnetic monopole field electromagnet and inductor of claim 1 further comprising:
   multilayer series-parallel wound wire layers positioned over a multiple number of spaced apart interleaved common ferromagnetic core support lamination strips, said strips having a starting point from leads of the first layer and extending over a first ferromagnetic lamination support and continuing in an opposed winding direction for a predetermined number of layers whereby a predetermined electromagnetic value for said variable magnetic monopole field electromagnet and inductor results.

14. An electric motor comprising:
   a variable magnetic monopole field electro-magnet and inductor comprising:
   a plurality of mirrored pairs of high density magnetic field windings including interleaved, laminated ferromagnetic supportive cores positioned between said mirrored pairs of windings;
   each field winding of one of said mirrored pairs of field windings having a number of windings equal to the number of windings as had by the other of the mirrored pair; and,
   each field winding of one of said mirrored pairs of field windings having field strength equal to the field strength of the other of the mirrored pair.

15. An electric generator comprising:
   a variable magnetic monopole field electro-magnet and inductor comprising:
   a plurality of mirrored pairs of high density magnetic field windings including interleaved, laminated ferromagnetic supportive cores positioned between said mirrored pairs of windings;
   each field winding of one of said mirrored pairs of field windings having a number of windings equal to the number of windings as had by the other of the mirrored pair; and,
   each field winding of one of said mirrored pairs of field windings having field strength equal to the field strength of the other of the mirrored pair.

* * * * *